Figure 1:
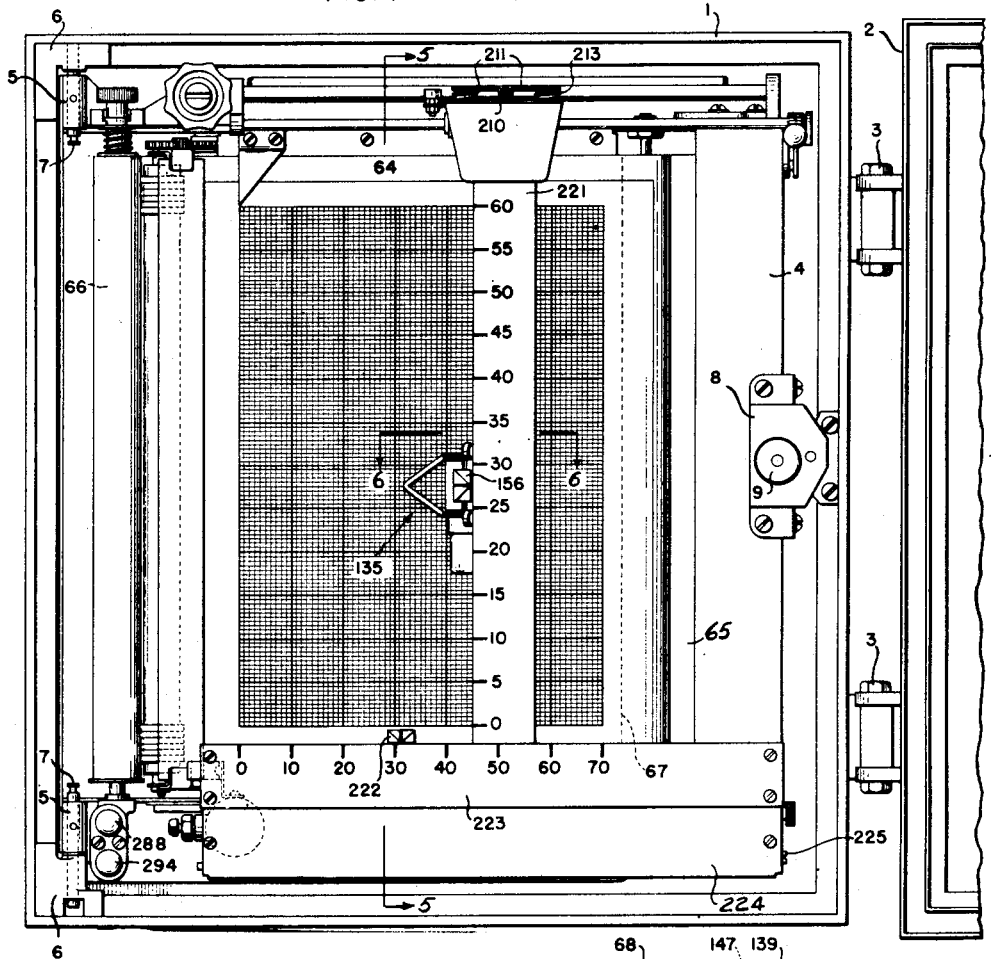

June 12, 1951 G. W. BARNES, JR 2,556,788
STANDARDIZING APPARATUS FOR BALANCING NETWORKS
Original Filed April 12, 1944 6 Sheets-Sheet 1

INVENTOR.
GEORGE W. BARNES JR.
BY
C. B. Spangenberg
ATTORNEY

June 12, 1951 G. W. BARNES, JR 2,556,788
STANDARDIZING APPARATUS FOR BALANCING NETWORKS
Original Filed April 12, 1944 6 Sheets-Sheet 2

*INVENTOR.*
GEORGE W. BARNES JR.
BY
ATTORNEY.

June 12, 1951  G. W. BARNES, JR  2,556,788
STANDARDIZING APPARATUS FOR BALANCING NETWORKS
Original Filed April 12, 1944  6 Sheets-Sheet 4

*INVENTOR.*
GEORGE W. BARNES JR.
BY
ATTORNEY.

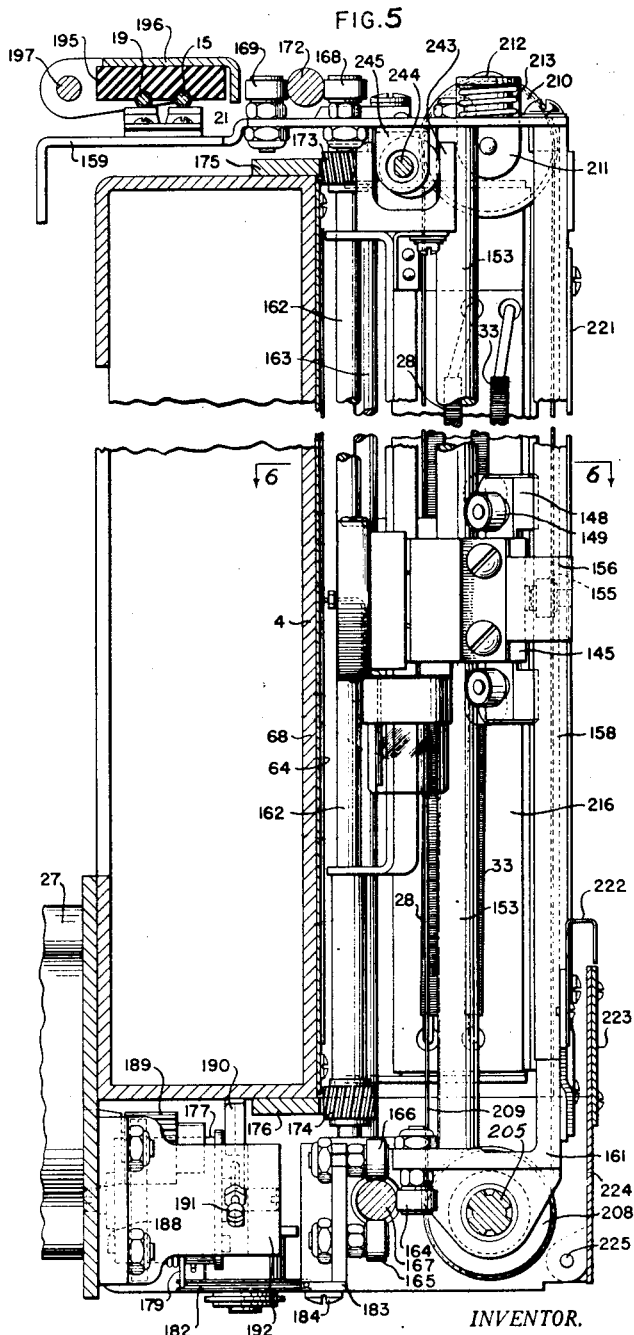

June 12, 1951  G. W. BARNES, JR  2,556,788
STANDARDIZING APPARATUS FOR BALANCING NETWORKS
Original Filed April 12, 1944  6 Sheets-Sheet 6

*INVENTOR.*
GEORGE W. BARNES JR.

BY
*G. B. Spangenberg*
ATTORNEY.

Patented June 12, 1951

2,556,788

UNITED STATES PATENT OFFICE 2,556,788

STANDARDIZING APPARATUS FOR BALANCING NETWORKS

George W. Barnes, Jr., Clifton Heights, Pa., assignor, by mesne assignments, to Minneapolis-Honeywell Regulator Company, Minneapolis, Minn., a corporation of Delaware Original application April 12, 1944, Serial No. 530,611. Divided and this application February 10, 1945, Serial No. 577,275

19 Claims. (Cl. 175—183)

1

The present invention relates to recording instruments, and more particularly recording instruments that are used to make simultaneously records of the values of two conditions on rectangular coordinates.

This application is a division of my copending application, Serial Number 530,611, filed April 12, 1944, now patent No. 2,527,207. That application is directed more specifically to the recording apparatus and its essential operating mechanism, while the present application is directed more specifically to the standardizing apparatus for the balancing networks used with the instrument.

In most recording instruments the value of a single condition is recorded against time by moving a marking element in one direction and moving the chart upon which the record is made at right angles thereto and at a constant speed. There are times, however, where it is more desirable to record the value of one condition with respect to the value of a second. In such a case a more complicated instrument is necessary since means must be provided for moving the marking element in two directions.

It is an object of the invention to provide an instrument in which the values of a plurality of variable conditions may be recorded simultaneously with a single recording element. It is a further object of the invention to provide an instrument in which a recording element is moved in one direction in response to variations in the value of one condition and in which the recording element is moved in a direction at right angles to the first direction in response to variations in the value of a second condition.

The instrument of the present invention is provided with a pair of motors each one of which, through suitable mechanism, serves to move the recording element across the chart in one direction. Each of these motors is controlled in its rotation by means of an amplifier that is responsive to the variations in a minute electric voltage. This voltage is directly responsive to variations in the condition being measured, such, for example, as the voltage produced by a thermocouple if temperature is being measure, or from a tachometer generator if speed is being measured. The chart upon which the record is made is drawn with rectilinear coordinates and is manually moved to bring a new surface under the recording element each time a record is to be made.

It is a further object of the invention to provide a self-balancing network that is responsive

2 to each of the conditions that are being measured and recorded. Each of the networks should be standardized or recalibrated from time to time and suitable means is provided for this purpose. It is therefore a specific object of the invention to provide a simple and efficient means for standardizing the two self-balancing networks.

It will be obvious to those skilled in the art that any two variables may be plotted against each other such as temperature against pressure, speed against distance, specific gravity against flow, or other variables.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Figure 6:
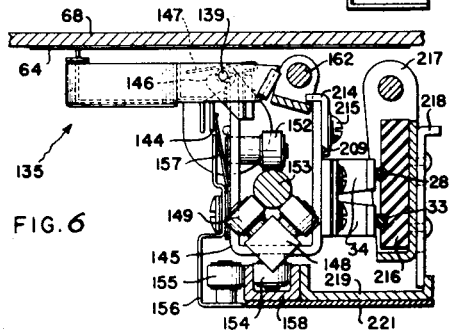
Figure 2:
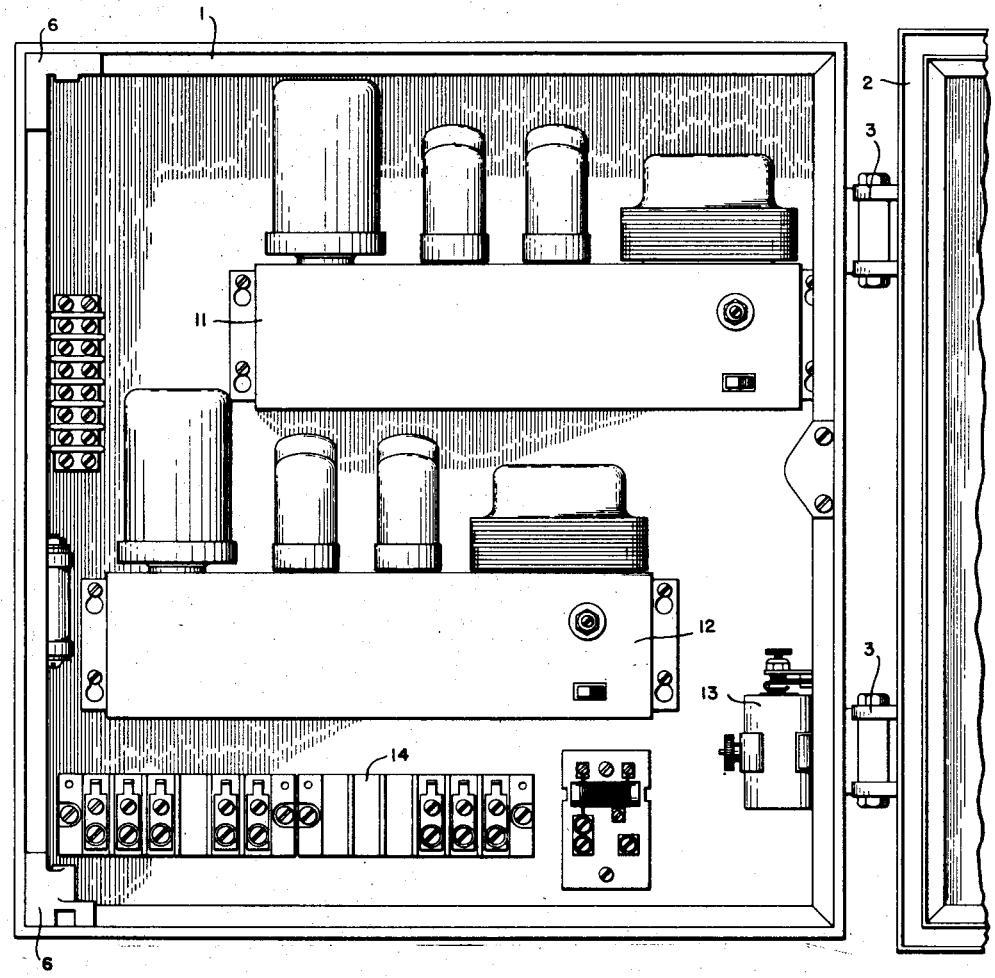
Figure 3:
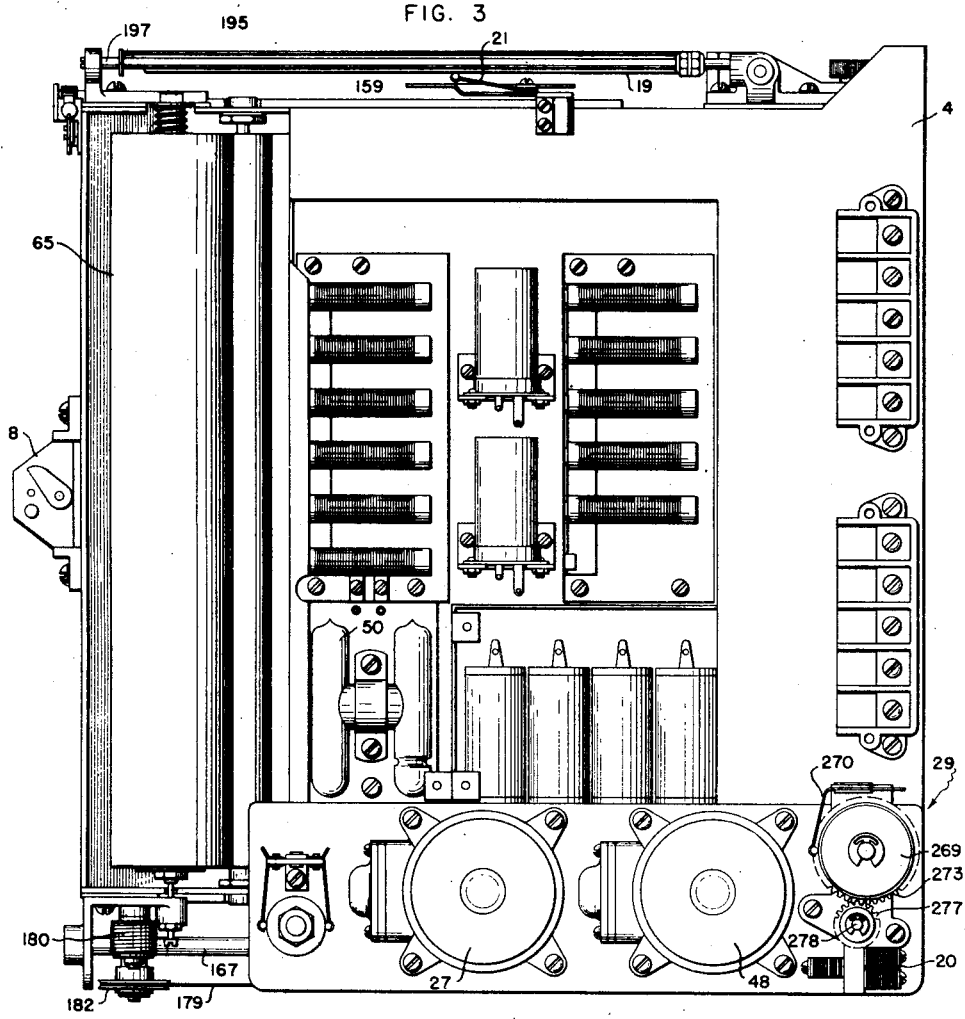
Figure 4:
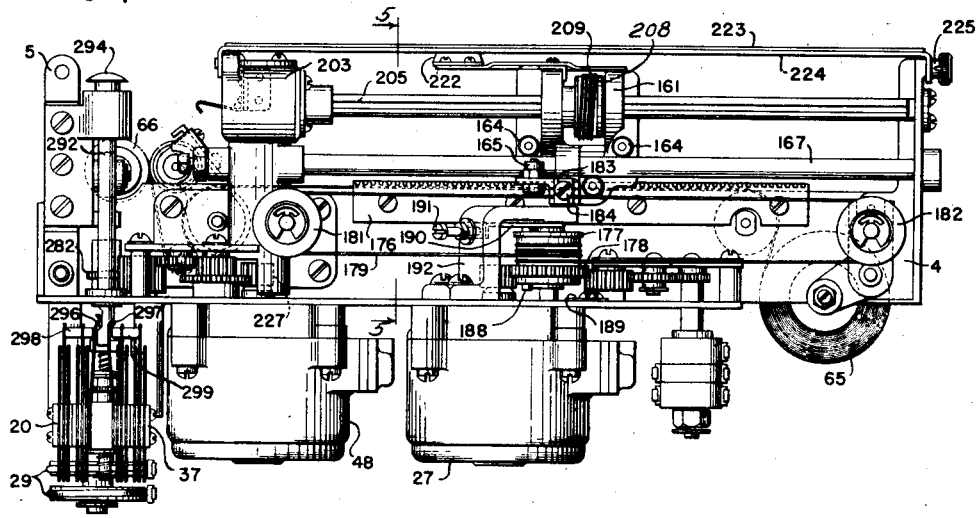
Figure 7:
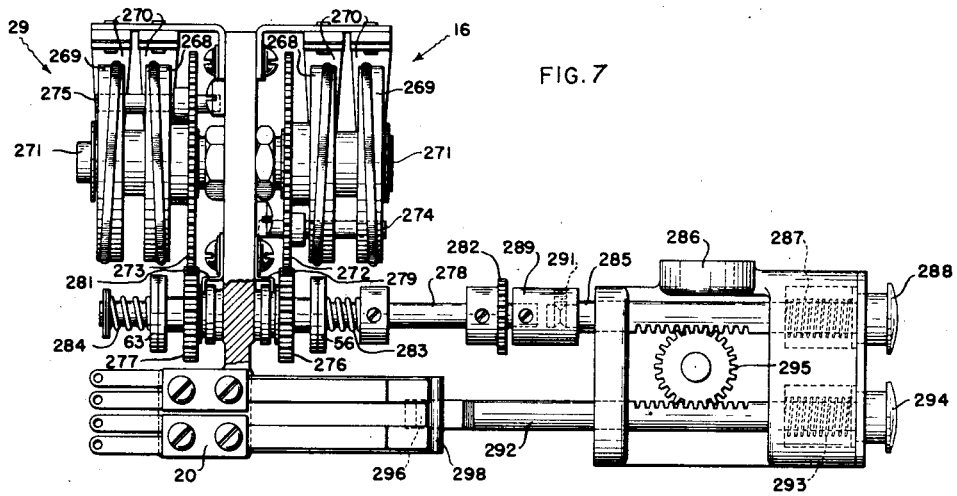
Figure 8:
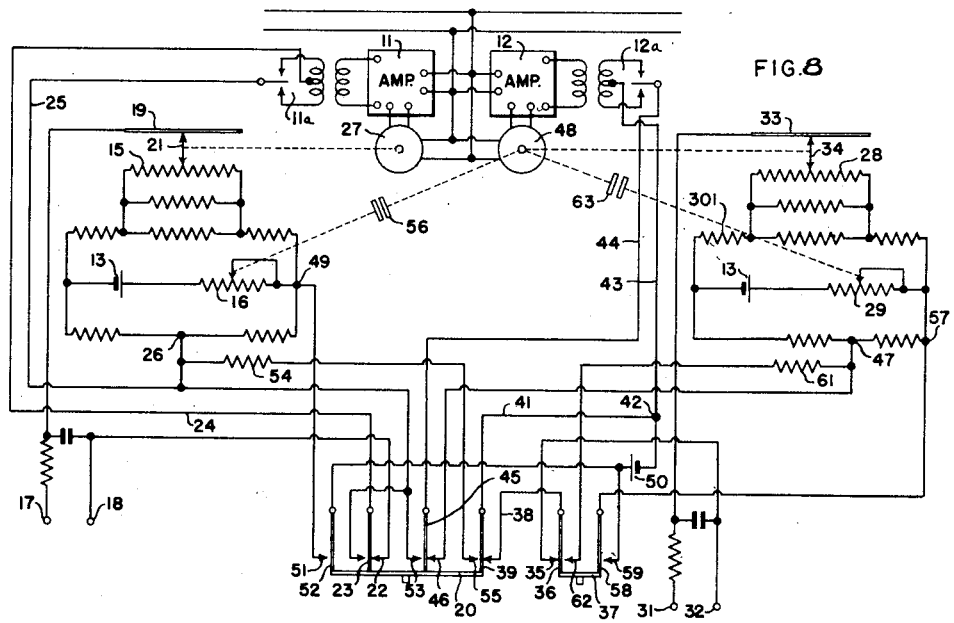

In the drawings:

Figure 1 shows a front view of the instrument with the casing door open,

Figure 2 is a view of the instrument casing with the chassis swung out of position, Figure 3 is a back view of the mechanism supported on the chassis, Figure 4 is a bottom view of the chassis, Figure 5 is a view taken on line 5—5 shown in Figures 1 and 4, Figure 6 is a top view of the pen supporting carriage taken on line 6—6 shown in Figures 1 and 5, Figure 7 is a view of the standardizing mechanism, and Figure 8 is a wiring diagram for the measuring circuits.

Referring first to Figures 1 and 2, there is shown an instrument casing 1 which is rectangular in shape and which has a door 2 mounted thereon by hinges 3. The door is shown in its open position so that the parts within the casing may be seen. The chart supporting mechanism and the recording mechanism are both mounted on a chassis 4 that is swingably mounted in the instrument casing. To this end the chassis is provided with hinge members 5 that cooperate with hinge members 6 on the casing. Hinge pins 7 extend through the members 5 and 6, so that the chassis is pivotally mounted. The chassis is held in position in the casing 2 by means of a lock 8 that is actuated by a knob 9.

When the lock is released and the chassis is swung out of the case, the interior of the casing will be exposed as shown in Figure 2. In this figure there is shown a pair of amplifiers 11 and 12 that are mounted upon the back of the casing. Mounted upon the side wall of the casing in line with each other are dry cells 13, one of which is used with each of the amplifiers. A series of terminal blocks 14 are also attached to the back of the casing so that the various electric connections may easily be made. In the drawings the wires which extend between the various parts of the instrument are omitted for the sake of clearness; the connections, however, are similar to those which are shown in the wiring diagram of Figure 8. The case is deep enough and the parts are so arranged on it and on the chassis that they do not conflict with each other when the chassis is swung into its position in the case.

Each of the amplifying units forms part of a complete potentiometer type circuit of the kind disclosed and claimed in the application of Walter P. Wills, Serial No. 421,173, filed on December 1, 1941, now Patent No. 2,423,540. These circuits are, however, connected in a novel manner so that the amplifying unit for one circuit may be used to standardize both circuits. The type of primary measuring element used has not been shown since it is immaterial, and may be responsive to any variable as long as a voltage varying in accordance with the value of the variable is produced. For example, for purposes of this description only, it may be assumed that a graph is being made of temperature plotted against pressure, with temperature as the ordinate and pressure as the abscissa.

The potentiometer circuit or network on the left in Figure 8 is normally connected with the amplifier 11. This circuit is provided with a slidewire 15 across which is impressed a potential by one of the batteries 13. As the battery voltage decreases with use the potential may be adjusted to a constant value by means of a variable resistance 16. An unknown voltage proportional to the variable is impressed across the slidewire in opposition to the known voltage. This unknown voltage is applied to terminals 17 and 18. From terminal 17 connection is made direct to a collector bar 19 and a contact 21 to the slidewire 15. From terminal 18 connection is made through stationary contact 22, movable contact 23, of a switch 20, and wire 24 to a center tap on the primary of a transformer forming part of a converter 11a that is built into amplifier 11. Connection is made from the converter, by wire 25 to a point 26 in the potentiometer network. When the potentiometer network is unbalanced due to a change in the input voltage, this unbalance is detected by the converter and amplified in a manner set forth in the above mentioned Wills application to energize a motor 27 for rotation in a direction dependent upon the network unbalance. As the motor 27 rotates it moves the contact 21 along the slidewire 15 and collector bar 19 in a direction and amount to rebalance the network and simultaneously adjusts a recording element.

The potentiometer network on the right of Figure 8 is similar to that on the left in that it is provided with a slidewire 28 across which a known voltage is impressed by a battery 13, the voltage being kept constant as the battery diminishes by a rheostat 29. The unknown voltage is applied to terminals 31 and 32, the former of which is connected directly with a collector bar 33 and movable contact 34. The terminal 32 is connected through stationary contact 35 and movable contact 36, of a switch 37, stationary contact 38 and movable contact 39 of the switch 20, wire 41, junction 42 and wire 43 to the center tap of the primary winding of a transformer forming part of a converter 12a of the amplifier 12. From the converter connection is made through wire 44 to a movable contact 45 and a stationary contact 46 of the switch 20 to a point 47 of the potentiometer network. As the network is unbalanced a motor 48 will be energized for rotation in one direction or the other by amplifier 12 to shift contact 34 along the slidewire 28 and collector bar 33 to a position in which the network is again balanced, and to simultaneously shift the recording element in a direction at right angles to the direction in which it was moved by motor 27.

In the normal operation of the instruments the circuit connections are as shown in Figure 8. From time to time, as the batteries 13 diminish in strength the networks must be recalibrated or standardized by adjusting the resistances 16 and 29. When this is done the potentiometer circuits are disconnected from the input terminals 17 and 18, and 31 and 32 respectively, and have a standard cell 50 connected across a portion thereof. The same amplifier is used for both potentiometer networks during the standardizing operation.

To standardize the left network, the movable contacts of switch 20 are moved to the left by a bar that connects them. When this is done the converter 12a and standard cell 50 are connected in that circuit between points 49 and 26 by a connection including a wire extending from point 49 to stationary contact 51, movable contact 52, cell 50, junction 42, and wire 43 to the transformer of converter 12a. From the converter the connection extends through wire 44, movable contact 45, and a stationary contact 53 to the junction point 26. At the same time this is done a resistance 54 is shunted across the converter 12a. The circuit for this is from junction 42, wire 41, movable contact 39, and stationary contact 55 to resistance 54 and junction 26. The same operation that moves the contacts of switch 20 to the left is used to close a clutch 56, so that as motor 48 is rotated due to unbalance of the left potentiometer network the standardizing resistance 16 will be adjusted by it in a direction to recalibrate the network.

In standardizing the right network, the input thereto is disconnected and standard cell 50 and converter 12a are connected across points 47 and 57 by shifting the movable contacts of switch 37 to the right. The circuit for this operation is from point 57 to movable contact 58, of switch 37, stationary contact 59, cell 50, junction 42 and wire 43 to the converter. From the converter the circuit includes wire 44, movable contact 45 and stationary contact 46 to point 47. At the same time a resistance 61 is shunted across the converter by a circuit extending from point 47 through the resistance 61, stationary contact 62, movable contact 36 of switch 37, stationary contact 38 and movable contact 39 of switch 20 and wire 41 to junction 42. The operation of moving the contacts of switch 37 to the right is also used to close a clutch 63 so that rotation of motor 48, due to network unbalance, may be used to adjust the resistance 29 and recalibrate the network.

As the networks rebalance themselves and cause the motors 27 and 48 to rotate, these motors through mechanism to be described later, move a recording element across a chart. The chart in this case is numbered 64 and is shown as being in strip chart form and upon which are printed a plurality of individual charts made up of rectilinear coordinates. The chart supply roll 65, as best shown in Figure 4, is mounted on one side of the chassis 4 while the take-up roll is mounted at 66 on the other side of the chassis. On its way from the supply roll to the take-up roll the chart passes suitable guide rolls which guides its across the front of a platen 68. Thus the chart is moved from one side of the chassis to the other across the front of a writing platen which serves to back up the chart while a record is being made upon it. The various resistances and condensers necessary for the potentiometer networks and the standard cell 50 are mounted on suitable supports provided on the back of the chassis 4 as shown in Figure 3. For the sake of clearness, no wiring is shown in that figure.

The pen 135 which is used to make a record on the chart is mounted on a vertically movable carriage that is in turn mounted on a horizontally movable frame. Because of this type of mounting the pen can be moved in any direction across the chart to record the varying values of the two conditions that are being measured.

A pen carriage is provided upon which the pen is mounted and has its frame member formed of a U-shaped part 145. Attached to the end of one of the legs of the U is a pair of brackets 146 which are mounted one above the other at a distance apart, so that they come just inside the ends of the frame of the pen. Also attached to this end of the U member 145 is a spring 147 which extends across in front of the brackets 146. The pen is mounted on the pen carriage, as best shown in Figure 6, by moving the pen into engagement with the spring 147, and then to the right along this spring until a pivot pin 139 moves under and into engagement with a notch formed in the brackets 146. The pen is then held in position with the pivot pin being pressed into engagement with the brackets 146 by the spring 147 as is best shown in Figure 6.

In order to guide the pen carriage in its vertical movement a block 148 is attached to the cross member of the U 145. This block has rollers 149 on it which rollers, along with a third roller 152 engage a vertically extending rod 153.

The carriage is also provided with a pair of front rollers 154 and 155, the latter of which is supported on the pen carriage by means of a supporting member 156 that is attached to the U-shaped member by suitable screws. It is noted that these screws also hold a spring 157 which is adapted to bear against the right face of the part 144 on the pen to force the pen in a clockwise direction around the pivot pin 139 into engagement with the chart. Rollers 154 and 155 engage one of the flanges of a channel member 158 which extends in a vertical direction and is parallel to the rod 153. It will be seen that the cooperation of the various rollers with the rod and with the channel hold the pen carriage in a predetermined position relative to the chart so that the pen will at all times engage the chart as the pen carriage is raised and lowered.

Rod 153 and channel 158 form part of a movable frame upon which the pen carriage is mounted, which frame is adapted to be moved transversely of the instrument from left to right in Figure 1. The frame, as seen in Figure 5, consists of an upper plate member 159 and a lower casting 161 to which the rod and channel member are fastened. The plate and casting also have extending between them two other rods, 162 and 163. The frame is supported in a fixed vertical position by rollers 165 and 166 which bear against the top and bottom of a horizontally extending rod 167. There is also provided a plurality of rollers 164 which bear against the sides of rod 167 to definitely locate the path through which the frame will move. The upper end of the frame is restrained to move through a given path by means of rollers 168 and 169 which bear against the front and back of a rod 172 that extends transversely of the frame parallel to the rod 167. In order to keep the frame aligned vertically and to make sure that the upper end of the frame is exactly above the lower end of the frame as it is moved across the instrument, the rod 162 is rotatably mounted in the frame and is provided on its ends with pinions 173 and 174 which mesh respectively with racks 175 and 176 that are attached to the chassis 4 above and below the writing platen. Therefore, as the frame is moved across the front of the instrument, the engagement between the racks and pinions will insure a continued vertical position of the same.

The frame carrying the pen carriage and pen is moved horizontally across the front of instrument by means of the motor 27 in response to unbalance of the left hand potentiometer network in Figure 8. To this end, the motor 27 is attached to the lower part of the chassis 4, on the back thereof, as shown in Figures 3 and 4. As the motor rotates, it drives a pulley 177 through suitable gearing, including a gear 178 that is formed on the pulley. Rotation of the pulley is transferred to the frame by means of a cable 179 which has its ends wrapped around and attached to the pulley 177. The central part of the cable extends from the lower surface of the pulley around guide pulleys 181 and 182, the latter of which is biased in a clockwise direction in Figure 4 by a spring 180 (Fig. 3) in order to keep the cable under tension. Movement of the cable as the pulley 177 rotates is imparted to the frame due to the fact that the cable is attached to the casting 161 of the frame by meas of a block 183 which grips the cable between itself and the casting. A screw 184 is provided for this purpose.

As the pulley 177 is rotated by the motor 27, it is shifted axially so that the cable will be fed on and off of the pulley in a helix. This prevents the convolutions of cable from piling up on one another and binding. Extending through the pulley 177 and projecting from both ends thereof is a stop pin 188 that serves to positively limit the number of revolutions which may be imparted to the pulley as it rotates. If the pulley is rotating in a direction to move the frame to the right in Figure 4, it will be moved downwardly since the cable will be fed on from the right and off from the left. When the frame has reached the end of its travel the lower end of pin 188 will engage stop 189. If the frame is moving in the other direction or to the left in Figure 4, the pulley 177 will be moved upwardly until the upper end of the pin 188 engages against the stop 190. Since it is necessary that the movement of the frame be limited to exactly the extent of the calibrated portion of the chart, one of the stops, and in this case the stop 190, is made adjustable by means of a screw 191 that extends through the bracket 192. In adjusting the above described mechanism the pulley 177 is rotated until the lower end of pin 188 engages stop 189. The frame is then attached to the cable with the frame in a position so that the recording tip of the pen is on one edge of the calibrated portion of the chart. The motor 27 is then energized for rotation to move the frame in the opposite direction until the recording tip of the pen engages the other end of the calibrated portion of the chart. This is approximately three and one half rotations of the drum 177 and its diameter is made so that this is the case. In order to definitely limit the travel of the frame at this point the screw 191 is adjusted to move stop 190 into engagement with the pin 188.

As has been pointed out above, the movable frame is moved transversely of the instrument when the potentiometer network is unbalanced. This movement continues until the network is rebalanced, and the balance point is determined by the proper position of contact 21 along slide wire 15 and collector bar 19. To this end the contact 21 is resiliently mounted on the upper plate 159 of the frame as shown in Figure 5. The slidewire 15 and collector bar 19 are mounted above the contact in an insulating block 195 that is in turn fastened to a support 196. This support is pivoted on a shaft 197 extending transversely of the chassis in such a fashion that the slidewire and collector bar are directly above the contact. In order to clean the slidewire from time to time the frame may be swung around shaft 197 as a pivot. This positions the slidewire support so that the slidewire is facing upward in an accessible position.

The pen carriage is moved vertically on the shiftable frame by the motor 48 in response to unbalance of the right hand potentiometer network in Figure 8. For this purpose, the motor is mounted on the lower portion of the chassis 4 and over to one side beyond the travel of the frame. As the motor rotates it acts through suitable gearing to rotate a splined shaft 205 that has on it a pulley 208, as shown in Figures 4 and 5, which pulley is slidably received on the shaft 205 and is moved along the shaft as the frame moves by portions of the casting 161 which engage its sides. The pen carriage is raised and lowered by a cable 209 which has its ends fastened to pulley 208. The center portion of the cable passes over a pulley 210 as shown in Figure 5, which pulley is mounted in the upper portion of the movable frame by means of a pair of angle brackets 211 that are located on top of the plate 159 by means of pins 212. Pulley 210 is normally biased in an upwardly direction in order to maintain the cable 209 under tension by a pair of springs 213 which surround the pins 212 and are located between the upper surface of the plate 159 and the lower surface of the angle brackets 211. As the cable is driven it moves the pen carriage by a clamp 214 that holds the cable tightly against the carriage and a screw 215 that serves to hold the clamp in place.

Unbalance of the potentiometer network causes the motor 48 to start rotating to raise or lower the pen carriage. When the potentiometer network has been rebalanced the motor will stop rotating. To this end the contact 34 is attached to the side of the pen carriage and extends into engagement with the slidewire 33 and collector bar 28 that are mounted on a vertically positioned insulating block 216. This block is fastened to a support 217 that is pivoted to move around the shaft 163. Normally the support is held in the position shown in Figure 6 by means of a latch including a finger 218 that is slidably mounted on the support and which finger engages the turned up edge of a bracket 219 that is attached to the channel 158. The resiliency of the contact 34 bearing against the slidewire tends to move the support 217 in a counter-clockwise direction in Figure 6 until the latch 218 engages the bracket 219. In this manner the slidewire is definitely positioned relative to the contact. By moving the latch 218 upwardly in Figure 6, its lower end will be brought out of engagement with the bracket 219, and the entire slidewire assembly may be moved to a position in which it is accessible for cleaning.

It is noted that the holder 156 for roller 155 serves as a pointer to indicate the position of the carriage along a scale 221 that is attached to the front portion of the channel member 158 and the bracket 219. It is also noted that the frame has on it a pointer 222 which cooperates with a scale 223 that extends across the lower portion of the instrument to show the position of the frame with respect to the chart. The scale 223 is attached to a frame member 224 that is pivoted on the lower part of the chassis at 225. Thus the frame and the scale carried by it may be moved in a clockwise direction in Figure 5 to give access to the mechanism on the lower part of the chassis.

As was pointed out above, the instrument must be standardized from time to time to compensate for decrease in the voltage of the batteries 13. This is done by connecting the standard cell 50 into the circuit and by adjusting the rheostats 16 and 29 to recalibrate the potentiometer network. The rheostats 16 and 29 are similar in construction and are mounted on the back of the chassis near the bottom thereof. This construction is shown in detail in Figure 7 wherein it will be seen that each of the resistances is of the so called vernier type and comprises a fine winding 268 and a coarse winding 269 that are mounted on discs which are rotatable around a shaft 271. These windings are adjusted with respect to contacts 270 by means of a gear 272 for resistance 16 and a gear 273 for resistance 29. The gear 272 is provided with a rod 274 that projects therefrom through a hole in the disc for winding 268 and through a slot formed in the disc for winding 269. In this fashion as the gear 272 is rotated, the winding 268 will be moved immediately but the winding 269 will not be moved until after the rod 274 has been moved through the length of the slot formed in its disc. Thus upon the adjustment of the rheostat the coarse winding will not be moved until the adjustment provided by the fine winding has been used up. The gear 273 is provided with a pin 275 that cooperates with the discs upon which the resistances of the rheostat 29 are wound.

The gears 272 and 273 are rotated by means of gears 276 and 277, respectively, which are rotatable around a shaft 278 and which are maintained in their position relative to the gears 272 and 273 by holding members 279 and 281 respectively. These members are attached to the framework and engage in grooves formed in hubs of the gears. Shaft 278 is rotated by the motor 48 through gearing which extends between the pinion 227 of the motor shaft and a gear 282 which is mounted on the shaft 278. Rotation of the shaft 278 is imparted to the gears 276 and 277 by means of the clutches 56 and 63 that have been mentioned above. These clutches consist of discs that are keyed to and slidable on the shaft 278 and which are resiliently pressed toward the outer face of the gears 276 and 277, respectively, by springs 283 and 284. The opposite ends of these springs are held in position on the shaft by suitable collars. Shaft 278 is moved axially to the left to bring clutch disc 56 into engagement with the face of gear 276 by means of a shaft 285 that is journaled in a suitable frame 286 attached to the chassis. This shaft 285 is normally held in its position shown by means of a spring 287 that surrounds the shaft 285 and is received in a recess in the frame 286. This spring bears against a button 288 on the outer end of the shaft 285. Connection is made between the shafts 285 and 278 by means of a collar 289 that is attached to the end of the shaft 278 and which receives the end of shaft 285. As best shown in Figure 7, the shaft 285 is formed with a groove in its end, which groove receives a set screw 291 extending through the collar 289. By means of this connection, axial movement may be imparted to the shaft 278 but that shaft can rotate without rotating shaft 285. Shaft 278 is moved to the right to bring clutch disc 63 into engagement with the adjoining face of gear 277 by means of a shaft 292 that is also journaled in the frame 286. The shaft 292 is held in the position shown by means of a spring 293 that engages with a button 294 formed on the end of the shaft. It will be seen from the drawing that shaft 292 is formed on its upper side with a rack that meshes with a pinion 295 that also meshes with a rack formed on the lower side of shaft 285. Thus, when the button 294 is pushed to the left, pinion 295 is rotated clockwise and shafts 285 and 278 are moved to the right to close clutch 63.

In order to properly standardize the instrument, it is necessary to simultaneously shift the switch 20 when clutch 56 is closed and shift the switch 37 when clutch 63 is closed. The left end of shaft 292 is used for this purpose. Referring to Figure 4 of the drawing, it will be seen that this shaft is formed with a cam surface 296 that will move the switch operating button 298 to the left when shaft 292 is moved upwardly in Figure 4, or to the right in Figure 7. Shaft 292 is also formed with a cam surface 297 that will move the actuating button 299 for switch 37 to the right when shaft 299 is moved downwardly in Figure 4 or to the left in Figure 7. Thus it will be seen that when the buttons are pushed to close clutch 56, switch 20 will be thrown, and when clutch 63 is closed switch 37 will be thrown. Any unbalance in the potentiometer circuits due to diminishing battery voltage will be compensated for by the motor 48 as it rotates and adjusts the resistances 16 or 29 respectively.

The general operation of the device should be apparent from the above detailed description. The instrument is adapted to make a graph of two variable conditions, and in so doing uses two potentiometer networks, one of which is unbalanced as the vertical component of the graph changes and the other of which is unbalanced when the horizontal component of the graph changes. Thus, the pen can be moved across the chart in response to variations in the variables. The instrument is compact and the various parts are readily accessible for adjustment and repair.

While in accordance with the provisions of the statutes, I have illustrated and described the best form of this invention now known to me, it would be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

Having now described this invention, what I claim as new and desire to secure by Letters Patent is:

1. In a recording instrument, the combination of a pair of balanceable electrical networks each having a pair of terminals to which an unknown voltage may be applied and an adjustable resistance, an amplifier electrically coupled with each network and responsive to the unbalance thereof, a standard cell to be associated with either network, a pair of switches each having engageable and disengageable contacts which in their normal positions connect said networks with their pairs of terminals and associated amplifiers, one of said switches having contacts which in one position disconnect one of said networks from its said pair of terminals and connect said standard cell in circuit therewith, the other of said switches having contacts which in one position disconnect both of said networks from their said pairs of terminals and connect the other of said networks in circuit with said standard cell and the amplifier normally electrically coupled with said one of said networks, and a manually operable push button slidable to engage and move said switches.

2. In a recording instrument, a pair of balanceable electrical networks each having electrically connected in one mesh thereof an adjustable resistance to be adjusted to standardize the network, an amplifier electrically coupled with each network and responsive to unbalance thereof, a motor electrically connected to and energized for rotation in one direction or an opposite direction by each amplifier, a standard cell, switches having circuit making and breaking contacts which connect said amplifiers in circuit respectively with said networks, or connect said standard cell and one amplifier in circuit with either network, a train of mechanical gears and shafts between each of said adjustable resistances and the motor energized by said one amplifier, a clutch in the adjusting train between said last mentioned motor and each adjustable resistance whereby said motor may run without adjusting said adjustable resistances, and a manually operable push button which engages said switches to throw simultaneously said switches to a position to connect one of said networks to said one amplifier and which engages one and disengages the other of said clutches to close the clutch between said last mentioned motor and the adjustable resistance of that network whereby said adjustable resistance will be adjusted as said motor rotates.

3. In a recording instrument, a pair of balanceable electrical networks, each network having electrically connected in one mesh thereof an adjustable resistance, a pair of amplifiers each electrically coupled to responsive to the unbalance of one network, a motor electrically connected with each amplifier and driven in one direction or an opposite direction in response to unbalance of the corresponding network, a standard cell, relatively engageable and disengageable electric switch contacts connected into said networks and in engagement with each other in normal position to connect said networks to said amplifiers respectively, said switch in engagement with each other in another position to connect either of said networks to one of said amplifiers and said standard cell, a manually operable push button which engages said switch contacts to operate said switch contacts from the normal position to said other position, and shafts and interlocking gears to connect the adjustable resistance of the network connected to said one amplifier with the motor associated with that amplifier so that said adjustable resistance may be adjusted as the motor rotates.

4. In a recording instrument in which the recording element is moved in response to the unbalance of a pair of balanceable electric networks, means to recalibrate each of said networks including an adjustable resistance electrically connected in each of said networks, a mechanical support for said resistances, means mounted on said support to adjust said resistances including a separate train of gearing for each resistance, a gear in one train of gearing being coaxial with a similar gear in the other train of gearing, a shaft coaxial with said gears, a pair of clutches on said shaft, one adapted to engage each gear, a manually operable push button to shift said shaft axially in one direction to bring one clutch into engagement with its associated gear, a second manually operable push button to shift said shaft axially in the opposite direction to bring the other clutch into engagement with the other gear, a spring to normally hold said shaft in a neutral position, and a motor to rotate said shaft.

5. In a recording instrument in which a recording element is moved in response to the unbalance of a pair of balanceable electrical networks which networks should be standardized from time to time, a pair of adjustable resistances each electrically connected in one network to be adjusted when the networks are standardized, a switch for each network to maintain said networks in operative condition having a normal first position and a second position assumed when the network with which it is associated is standardized, a drive motor for said adjustable resistances, a drive motor between each adjustable resistance and its clutch, and an operating mechanism simultaneously to close the clutch between the drive means and adjustable resistance for one network and move the switch for that network to its second position.

6. In a recording instrument, a pair of potentiometer networks, each including in its electrical circuit connections, an adjustable resistor for rebalancing or standardizing the network, and a first pair of terminals connected to said network and forming an input to said network for a voltage proportional to the variable to be recorded and a second pair of terminals forming an input to said network for a source of constant electrical potential providing a standard or rebalancing potential, a motor electrically coupled to one of said networks, a slidable contact electrically connected in one of said networks and mechanically driven by said motor to rebalance said one network, a source of constant electrical potential, a first electric circuit including a normally open first electric switch and connected in series between one side of said source and one of said second pair of terminals of the other of said potentiometer networks, a second electrical circuit including a normally closed second electric switch and connected between one of said first pair of input terminals of the other of said potentiometer networks and the other of said second pair of terminals of the other of said potentiometer networks, a third electric circuit including a normally open third electric switch and connected between the other of said second pair of terminals of said other of potentiometer network and one of the energizing connections of said motor, a fourth electrical circuit including a normally open fourth electric switch and connected between the other of said second pair of terminals of said other of said potentiometer networks and the other of the energizing connections of said motor, a fifth electrical circuit including a normally closed fifth electric switch and connected between the other of the energizing connection for said motor and one of the first pair of terminals of the one of said potentiometer networks, a mechanical connection ganging said electric switches together for simultaneous movement to open said normally closed switches and to close said normally open switches, a clutch forming part of a mechanical driving connection between said motor and the adjustable resistor of said one of said networks, and a second clutch forming part of a mechanical driving connection between said motor and the adjustable resistor of said other of said potentiometer networks.

7. Means to rebalance or standardize each of a pair of potentiometer circuits each circuit including a slide wire resistance and a variable resistance, said means including, a source of substantially constant potential, a device operative to compare the potential drop across each of said slide wire resistances separately to the potential of said source of substantially constant potential, a motor operative in response to any potential drop measured by said device to actuate separately each variable resistance to maintain a constant potential drop across that slide wire resistance in the potentiometer circuit connected to said slide wire resistance, a pair of clutches each interposed in the mechanical connection between said motor and one of said variable resistances, and an interlock between said clutches whereby one of said clutches is engaged when the other is disengaged.

8. A measuring instrument including, a plurality of balanceable electrical networks each having a plurality of component parts including a slide wire and a standardizing resistance and a contact moving in relation to said standardizing resistance, a motor operable in response to network unbalance to move each of said contacts relative to each of said resistances to a position in which the network containing the resistance and the contact is rebalanced, a shaft driven by said motor, a mounting for said standardizing resistances adjacent said shaft, engageable and disengageable driving means between said shaft and said standardizing resistances to drive either of the standardizing resistances from the shaft, and an interlock between said driving means so that the connection between said shaft and one of said standardizing resistances is open when the other is closed.

9. In an electrical measuring instrument, a support, variable standardizing resistances mounted on said support, contacts carried by said support and in engagement with said resistances, a first shaft, a motor having driving engagement with said shaft to rotate it, a second shaft adjacent said first shaft, clutches between said first shaft and said resistances whereby said first shaft may adjust either of said resistances if the clutch therebetween is closed, and a gear interposed between said shafts and providing an interlock therebetween to move said shafts axially at opposite directions.

10. In an electrical measuring instrument, a support, a plurality of variable resistances on said support, a shaft mounted on said support concentric with said variable resistances, a plurality of contacts each engaging one of said variable resistances, a second shaft mounted on said support for rotary and axial movement, bearing between each of said variable resistances and said second shaft for causing relative movement between one of said resistances and its cooperating contact when said second shaft is rotated, a third shaft slidably mounted in said support, an interlock between said second shaft and said third shaft so that said shafts move axially in opposite directions, clutches on said second shaft controlling the mechanical connection between said second shaft and said variable resistances, and springs normally stressing said second shaft to a position in which said clutches are engaged and providing yielding movement whereby axial movement of said second shaft opens one or other of said clutches.

11. In an electrical self-balancing measuring instrument, a support, a shaft on said support, variable resistances mounted on said support concentric with said shaft, contacts each engaging one of said resistances, a motor to provide relative movement between each of said resistances and its cooperating contact, a second shaft mounted for rotation by said motor and for axial movement, a pair of gears rotatably mounted coaxially with said second shaft, a third shaft slidably mounted adjacent said second shaft, clutch members on said second shaft adapted in one or the other axial position of said second shaft to engage and rotate one or the other of said gears and to disengage the other or the one of said gears, springs normally maintaining said second shaft in an intermediate position, and an interlock at all times connecting said second shaft and said third shaft for axial movement together in opposite directions.

12. In a self-balancing electrical instrument, a support, a plurality of variable resistors mounted on said support, contacts each engaging with one of said variable resistances, a first shaft mounted on said support for rotation and axial movement, gears driven by said shaft, clutches carried by said shaft and interposed between said shaft and each of said gears to provide a driving mechanism from said shaft to each of said variable resistances, a motor mechanically connected to said shaft to rotate it, a second shaft engaging said first shaft and mounted for slidable movement and permitting rotary movement of said first shaft, a frame providing a journal mounting for said second shaft, a third shaft also journaled in said frame, and a pinion pivotally mounted between said second shaft and said third shaft and meshing with racks formed on said shafts so that said shafts move axially in opposite directions, said second and third shafts providing means for axially moving said first shaft axially to disengage one or other of said clutches.

13. In a self-balancing instrument including, balanceable electrical networks each having a plurality of component parts including a slide wire, a contact in engagement with said slide wire, a standardizing resistance, and a second contact movable in engagement with said standardizing resistances, a motor operable in response to network unbalance to cause relative movement between either of said standardizing resistances and its cooperating second contact to rebalance the network in which said resistance and said second contact are connected, a first shaft driven by said motor, a mounting for said standardizing resistances, engageable and disengageable drive means mounted coaxially with said first shaft and providing driving connections between said first shaft and said standardizing resistances, a manually operable mechanism for selectively engaging one and disconnecting the other of said clutches, a standardizing cell providing a reference source of voltage, and an electric switch operated by said mechanism for connecting said standard cell to the network being standardized and for disconnecting said standard cell from the remainder of said networks.

14. In a potentiometer type self-balancing instrument, balanceable potentiometer networks each including a slide wire, a contact movable over said slide wire, a variable resistor, a second contact movable over said variable resistor, and a cell to impress potential on said slide wire, a standard cell to check said potential, condition responsive means each connected to one of said networks, a shaft mounted for rotation and axial movement, a device operative upon unbalance of one of said networks, a motor responsive to operation of said device to rotate said shaft to move one or other of said variable resistors relative to the second contact cooperating therewith to rebalance the network in which said variable resistor and said second contact are connected, operating mechanism for moving said shaft axially, clutches interposed between said shaft and said variable resistors and each movable to disengaged position upon axial movement of said shaft in one direction, and an electric switch having circuit connections for disconnecting the condition responsive means from the network which is to be rebalanced and for connecting the standard cell and said device to said network.

15. In a recording instrument, a pair of balanceable electrical networks, each network including an adjustable resistance and a pair of input terminals upon which an unknown voltage may be applied, a pair of amplifiers each electrically coupled to one of said networks and responsive to the unbalance thereof, a standard cell providing a reference source of voltage for rebalancing or standardizing each of said networks, an electric switch having engageable and disengageable contacts which in normal position connect each network with its associated amplifier and with its associated pair of input terminals so that each network is responsive to an unknown voltage applied to its input terminals, and which contacts in another position disconnect one of said networks from its associated pair of input terminals and connect said standard cell to said network in place of the unknown voltage normally applied to said pair of input terminals so that the network rebalances or standardizes in response to the reference voltage of said standard cell, and which contacts in another position disconnect both of said networks from their said pairs of associated input terminals and connect the amplifier of said one network to the other of said networks and connect said standard cell to said other network in place of the unknown voltage normally connected to said other network so that said other network rebalances or standardizes in response to the reference voltage of said standard cell, and a manually-operable push button engaging and moving said switch contacts into said various positions.

16. In a recording instrument in which a recording element is moved in response to unbalance of a pair of balanceable electric networks, a pair of adjustable resistances each electrically connected in one of said networks, common drive means operable to adjust said resistances, a pair of clutches each interposed between said drive means and one of said resistances, a pair of electric switches each electrically connected in one of said networks and movable from a normal first position in which said network is connected to an unknown voltage to a second position in which said network is connected to a standard voltage, and operating mechanism movable to close the clutch between the adjustable resistance for one network and said drive means and simultaneously to move the switch for that network from its normal first position to its second position.

17. Means to rebalance or standardize each of a plurality of potentiometer circuits, each circuit including, a slide-wire resistance and a variable resistance, said means including, a source of substantially constant electrical potential, an electric switch operative to disconnect all but one of said potentiometer circuits from and to connect the said one of said potentiometer circuits to said source of substantially constant electrical potential, a motor operative in response to any potential drop sensed by the potentiometer circuit connected to said source of substantially constant electrical potential to actuate the variable resistance of the connected circuit to maintain a constant potential drop across the slide wire resistance in the potentiometer circuit connected to said source of substantially constant electrical potential, a plurality of clutches each interposed in the mechanical connection between said motor and one of said variable resistance, and an interlock between said switch and said clutches operative to disconnect all but one clutch between said motor and the variable resistance in the potentiometer circuit connected to said source of substantially constant electrical potential.

18. In an electrical measuring instrument, the combination including, a support, standardizing resistors mounted on said support, contacts carried on said support and each in engagement with one of said resistors, a first shaft, a motor to rotate said shaft to produce relative movement between said resistors and said contacts, said motor being operable in response to any unbalance sensed by a potentiometer circuit connected to a source of standard voltage, each of said standardizing resistors forming the rebalancing element of one of said potentiometer circuits, a second shaft adjacent said first shaft, clutches each interposed between said first shaft and one of said resistors whereby said first shaft may adjust each of said resistors if the clutch therebetween is engaged, and an electric switch operated by said second shaft so that said electric switch connects that potentiometer circuit to the standard source of voltage in which circuit the standardizing resistor is connected by one of said clutches to said motor.

19. In a self-balancing measuring instrument, a support, a variable resistance mounted on said support, a contact mounted on said support and engaging said resistance, said resistance and said contact forming part of a self-balancing electrical circuit, a second variable resistance mounted on said support, a second contact mounted on said support and engaging said second resistance, an electrical motor, said second resistance and said second contact and said motor connected in a second self-balancing electrical network, a shaft connected to said motor so as to be rotated thereby and mounted for rotation and axial movement, gears between said shaft and said resistances providing driving connections whereby rotation of said shaft causes relative movement between either of said resistances and its cooperating contact, clutches each interposed between said shaft and one of said gears, and a second shaft having engagement with said first mentioned shaft to move it axially and free to permit rotation of said first mentioned shaft, movement of said first mentioned shaft axially serving to disengage one or the other of said clutches.

GEORGE W. BARNES, Jr.

REFERENCES CITED

The following references are of record in the file of this patent:

UNITED STATES PATENTS

| Number | Name | Date |
|---|---|---|
| 1,685,973 | Alexander et al. | Oct. 2, 1928 |
| 1,931,223 | Harrison | Oct. 17, 1933 |
| 2,096,047 | Leeds | Oct. 19, 1937 |
| 2,312,945 | Williams, Jr. | Mar. 2, 1943 |
| 2,315,682 | Wiegmann et al. | Apr. 6, 1943 |
| 2,368,912 | Barnes et al. | Feb. 6, 1945 |
| 2,404,891 | Schmitt | July 30, 1946 |
| 2,424,146 | Caldwell et al. | July 15, 1947 |